Sept. 25, 1928.
P. H. DAVEY ET AL
1,685,151
APPLYING THREADED BRACING RODS TO TREES
Filed Nov. 21, 1925
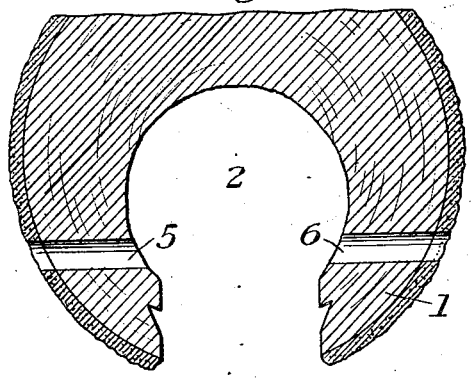
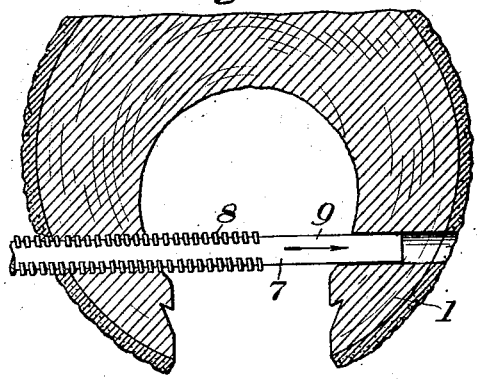
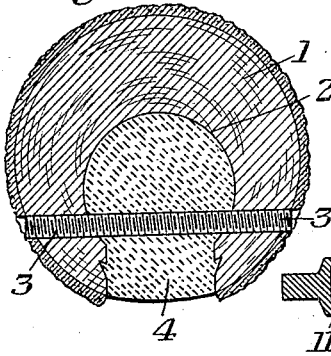
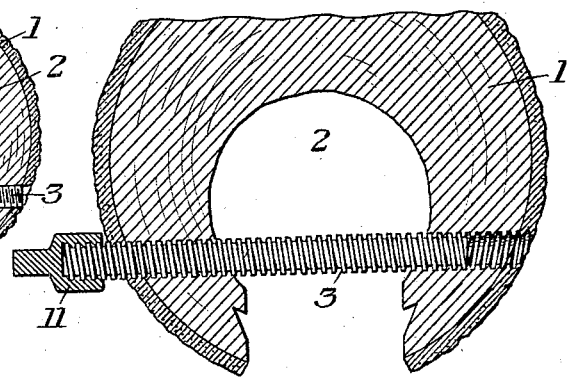
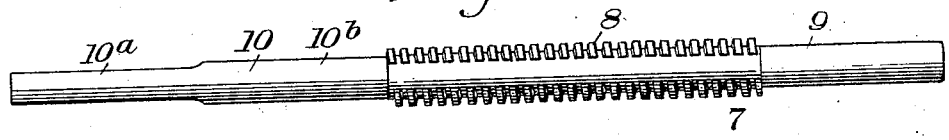
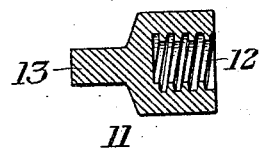
INVENTORS Patented Sept. 25, 1928.

1,685,151

UNITED STATES PATENT OFFICE.

PAUL H. DAVEY AND WILLIAM R. WILLIAMS, OF KENT, OHIO; SAID DAVEY ASSIGNOR OF ONE-FOURTH TO JAMES A. G. DAVEY, OF SOUND BEACH, CONNECTICUT, AND SAID WILLIAMS ASSIGNOR TO THE DAVEY TREE EXPERT COMPANY, OF KENT, OHIO, A CORPORATION OF OHIO.

APPLYING THREADED BRACING RODS TO TREES.

Application filed November 21, 1925. Serial No. 70,499.

The present invention relates to applying threaded bracing rods to trees, and particularly to the method and tools for so applying the bracing rods.

In the practice of tree surgery, it has often been necessary or desirable to apply bracing rods to hold parts of the tree, as for example, to apply bracing rods to hold the two sides of an excavated cavity or to hold the branches of a tree to prevent splitting in a crotch.

The present invention is illustrated with particular reference to the application of bracing rods to hold the sides of a tree cavity, but it will be understood that the bracing rods might be applied to other parts of the tree.

In the drawings which illustrate the application of bracing rods to a tree cavity:

Figure 1 is a horizontal section through the tree cavity and hole drilled to receive the rod;

Figure 2 is a similar view showing the tapping of the hole;

Figure 3 is a similar view showing the bracing rod partially inserted;

Figure 4 is a similar view showing the bracing rod in place and the cavity filled.

Figure 5 is an elevation of the tapping tool; and

Figure 6 is an elevation of the tool for screwing in the threaded bracing rod.

Referring to the drawings, reference numeral 1 indicates a tree trunk or branch having therein a cavity 2 to be filled. In the practice of tree surgery, the cavity in the tree formed by the rotting out or destruction of the wood is first further excavated to carefully clean out all infected or dead wood and is afterward filled with cement; the filling being usually put in in sections as shown in the patent of Wellington E. Davey, No. 958,478, dated May 17, 1910, for process of reinforcing trees. In filling cavities which are large in comparison with the tree trunk or branch, the parts of the tree on each side of the cavity are tied together by bracing rods to strengthen the tree and to prevent the wood from pulling away from the filling.

As shown in the drawings, the two parts of the tree at each side of the cavity are tied together by a bracing rod 3, as shown in Figure 4. The cement filling which is put into the cavity after the bracing rods are in place is indicated by reference numeral 4 in Figure 4.

In accordance with the practice of the present invention, we use screw-threaded bracing rods and drill and tap the rod-receiving holes in the tree before inserting the bracing rod. The first step is to drill aligned holes, indicated at 5 and 6 in Figure 1. These holes may be drilled out with an ordinary auger, preferably driven by power, such as an air turbine or an electric motor, although the holes may be drilled by hand. The next step consists in tapping or threading the holes as shown in Figure 2, by means of a tapping tool 7, preferably of the form shown in Figure 5. This tapping tool consists of a straight bar having its middle portion formed as a tap 8 to cut screw threads in the holes. This tapping portion 8 is made with the usual interrupted tap threads as shown in the drawing. The tool has a forwardly extending guide portion 9, which is arranged to precede the tapping portion into the hole and guide it. This guiding portion 9 is smooth and is preferably such as to form a rather loose sliding fit through the hole to be tapped. The tapping tool has a shank 10, having a squared or flattened end $10^a$, to be received in a bit brace or similar driving tool, preferably power driven. In case of a hole which is nearly as long as the tapping tool, the tapping tool may be turned in as far as the engagement with its driving tool will permit and until the guide portion 9 emerges, and then the tapping operation may be continued by turning the tool by engaging the projecting guide portion 9 with a pipe wrench, the guide portion 9 thus enabling the tool to be used in tapping a longer hole than otherwise possible.

The shank 10 adjacent the tapping portion 8 of the tool is formed with the rearwardly extending guide portion $10^b$, which is smooth and of the same size as the forwardly extending guide portion 9.

The guide portions 9 and $10^b$ serve to keep the tool centered in the hole being tapped and to keep the thread from being cut deeper on one side of the hole than on the other, which may occur due to inequality in the hardness or grain of the wood. They also serve to insure the better entry of the tapping tool into the second hole when the tool is passing through one aligned hole to the other, as for example, in entering the hole at the opposite end of the cavity, as indicated in Figure 2.

After the holes are drilled and tapped, a piece of bracing rod 3 is cut off from a previously threaded rod of indeterminate length. The bracing rod 3 is inserted into the threaded end of the tapped hole, as indicated in Figure 3. The rod is partly screwed in by means of the screwing-in tool 11, shown in detail in Figure 6. This tool has a threaded cavity 12, which fits over the rear end of the bracing rod 3, and a short shank portion 13, arranged to be engaged by a bit brace or similar driving tool. As shown in Figure 3, the bracing rod may be screwed in with the tool 11 until it is nearly in place. The tool 11 is then removed and the rod is turned home by engaging its intermediate portion, which is exposed in the cavity, with a pipe wrench or similar tool and turning the rod into the position shown in Figure 4. The cavity is then filled in the usual manner.

While the present invention has been particularly illustrated and described with relation to bracing the sides of cavities, it will be understood that it may be otherwise used, as for example, in bracing separate tree limbs, within the scope of the following claim.

We claim:

The method of treating a tree cavity consisting in forming uniform openings in the side edges of the cavity, threading said openings, and connecting said threaded openings by bracing means filling said openings and terminating at or near the outer ends thereof.

In testimony whereof we have hereunto set our hands.

PAUL H. DAVEY.
WILLIAM R. WILLIAMS.